United States Patent [19]

Seely

[11] 4,324,476
[45] Apr. 13, 1982

[54] CAMERA DOOR APPARATUS

[75] Inventor: Neil G. Seely, Rochester, N.Y.

[73] Assignee: Eastman Kodak Company, Rochester, N.Y.

[21] Appl. No.: 260,876

[22] Filed: May 6, 1981

[51] Int. Cl.³ .................... G03B 17/02; G03B 1/00
[52] U.S. Cl. .................................... 354/288; 354/212
[58] Field of Search ............. 242/71.1; 354/203, 275, 354/288, 289, 214–215, 212, 213, 204–206

[56] References Cited

U.S. PATENT DOCUMENTS

| | | | |
|---|---|---|---|
| 1,001,387 | 8/1911 | Goddard | 354/192 |
| 2,455,111 | 11/1948 | Carbone | 354/87 |
| 2,967,471 | 1/1961 | Sommermeyer | 354/215 |
| 3,420,154 | 1/1969 | Lieser et al. | 354/215 |
| 3,860,942 | 1/1975 | Hennig | 354/275 |

FOREIGN PATENT DOCUMENTS 949324 9/1956 Fed. Rep. of Germany .......... 95/31
362322 4/1906 France .

Primary Examiner—Donald A. Griffin
Attorney, Agent, or Firm—R. A. Fields

[57] ABSTRACT

In a bottom-loaded camera, a bottom door is manually opened to allow insertion of a film container into the camera and a back door is automatically opened, in conjunction with the opening of the bottom door, to move a pressure plate on the back door to provide space for locating film from the container in the camera. Closing the bottom door closes the back door.

8 Claims, 9 Drawing Figures

CAMERA DOOR APPARATUS

BACKGROUND OF THE INVENTION

1. Field of the Invention

The present invention relates generally to photographic cameras, and more particularly to an improved door construction for efficiently opening and closing a camera for film loading and unloading.

2. Description of the Prior Art

A number of still picture cameras available today are "bottom-loaded" cameras. Typically, in the bottom-loaded camera, which usually is a 35mm type, such as the Leica M5 or as disclosed in German Pat. No. 949,324, a film supply chamber is opened at the bottom of the camera by removing a baseplate from the camera body or by opening a bottom door of the camera. A film cassette or a film magazine containing a coiled 35mm filmstrip is inserted endwise, i.e., axially, into the bottom opening to the supply chamber.

Before any film is loaded in the camera, however, a back door must be opened in order to move a film pressure device, such as a spring-urged plate on the inside of the back door, from the camera interior. This is done to provide sufficient space for threading a film leader from the film cassette or magazine in the supply chamber, across an exposure frame, and into a film take-up chamber.

Separate manual operation of a back door and a baseplate or a bottom door in known bottom-loaded cameras is cumbersome and slows down film loading. Moreover, often, the back door cannot be opened until after the baseplate is removed from the camera body or the bottom door is opened, which adds to the time required for film loading.

SUMMARY OF THE INVENTION

The above-described problems associated with known cameras are believed solved by the present invention. Specifically, the present invention provides an improved door construction for efficiently and quickly opening and closing a camera for film loading.

In keeping with the teachings of the present invention, there is disclosed, preferably in a bottom-loaded camera of the type wherein a bottom door is opened to allow insertion of a film container into the camera and a back door is opened to move a film pressure member on the back door to provide space for locating film from the container in the camera, the improvement comprising:

means supporting the bottom door and the back door for opening and closing movement on separate axes; and means for opening the back door in response to opening movement of the bottom door and for closing the back door in response to closing movement of the bottom door.

According to a preferred embodiment of the present invention, the back door is supported for pivotal opening and closing movement on a first axis and the bottom door is supported for pivotal opening and closing movement on a second axis substantially parallel to the first axis. Connecting means pivotally joins the back door and the bottom door along the second axis. The bottom door and the connecting means are coupled with cam means for pivoting the back door open in conjunction with opening movement of the bottom door and for pivoting the back door closed in conjunction with closing movement of the back door. The cam means includes a follower member and motion-imparting means. The follower member is fixed to the bottom door and to the connecting means, for pivoting on the second axis with the bottom door. The motion-imparting means is coupled to an end portion of the follower member which is spaced from the bottom door and the connecting means, for restraining the end portion to translational and pivotal movements as the bottom door is pivoted on the second axis. Owing to this design, the follower member urges the connecting means to pivot the back door on the first axis in conjunction with pivoting of the bottom door on the second axis.

Therefore, with the preferred embodiment, opening and closing of the camera for film loading is a relatively quick one-step operation.

DESCRIPTION OF THE PREFERRED EMBODIMENT

The present invention is described as being embodied in a relatively simple 35mm camera. Because such cameras are well known, this description is directed in particular to elements forming part of or cooperating directly with the preferred embodiment. It is to be understood, however, that other elements not shown or described may take various forms known or obvious to one having ordinary skill in the design of cameras.

Figure 1:
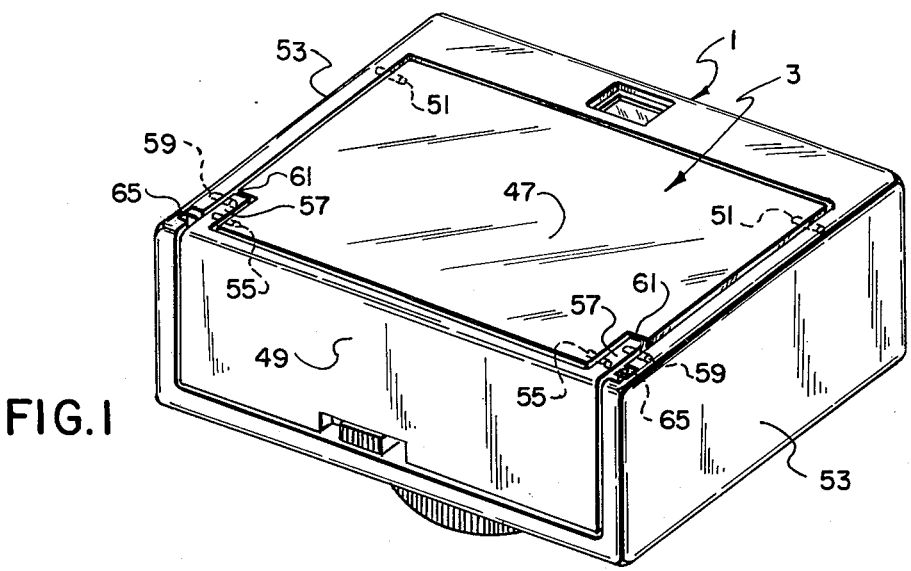
FIG. 1 is a rear perspective view of a photographic camera.
Figure 2:
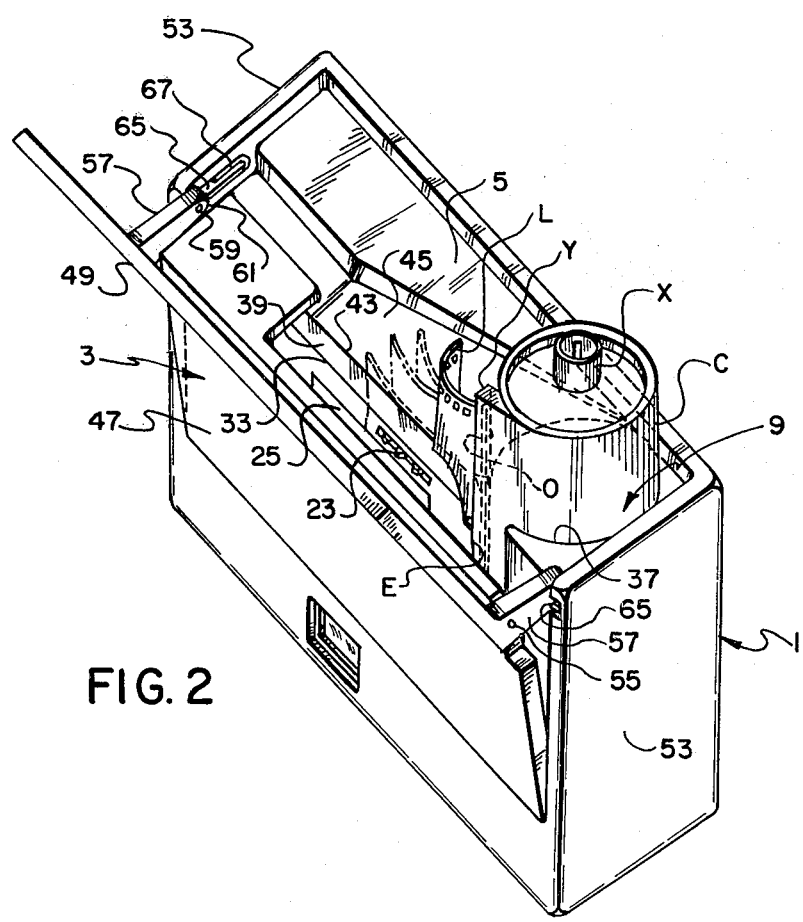
FIG. 2 is a bottom perspective view of the camera, opened to show loading apparatus for uncurling a film leader extending from a film container and for guiding the uncurled leader into the camera as the film container is received in the camera.

Referring now to the drawings, and in particular to FIGS. 1 and 2, there is shown a bottom-loaded 35mm camera for receiving a film container C, such as a conventional 35mm film magazine or film cassette. The film container C, as is known, includes a rotatably mounted core member X, which supports a coiled 35mm filmstrip within the film container. The filmstrip has a normally curled leader L extending out of a light-tight opening O in a lipped portion Y of the film container C. The camera, in accordance with the invention, comprises a body portion 1 and a compound or multi-element articulated cover door 3. Details of the cover door 3 are described below, after a description of certain apparatus for film loading. However, in connection with film loading, it should be observed, as shown in FIG. 2, that the cover door 3 can be partially opened to uncover a bottom portion 5 of the camera body 1.

Figure 3:
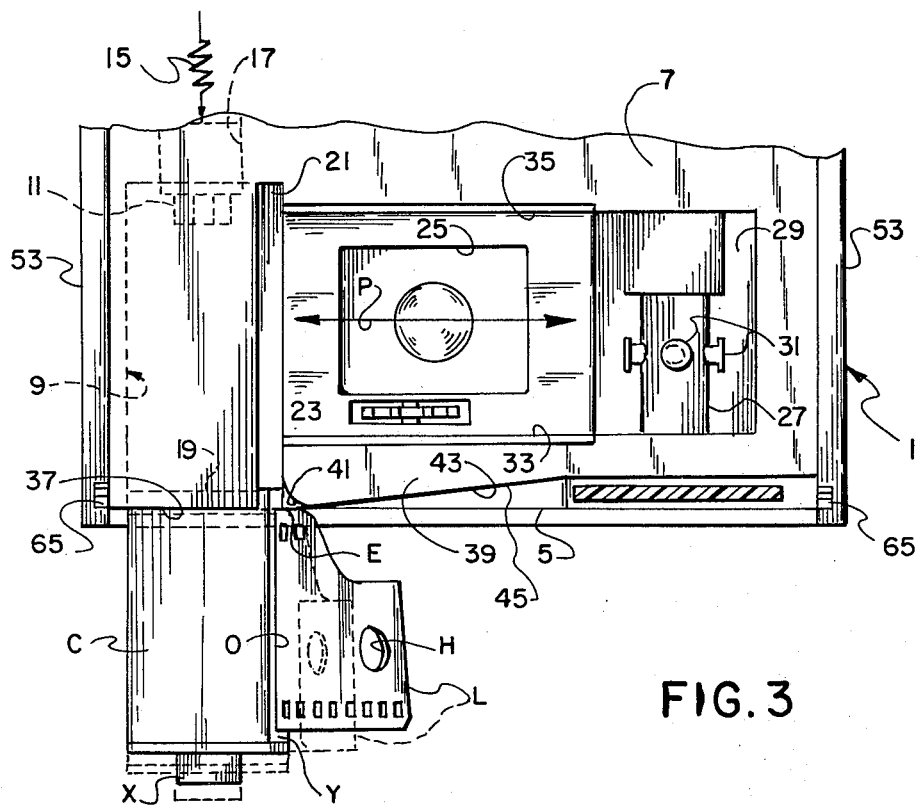
FIG. 3 is a back elevation view of the opened camera, depicting an initial state of film loading.

The camera body 1, as shown in FIG. 3 with the cover door omitted for the sake of clarity, is partially open at a back portion 7 to provide access to the camera interior for a number of conventional purposes, such as clearing a film jam, and cleaning or repairing an interior mechanism. A loading or supply chamber 9 in the camera body 1 is shaped to receive and hold the film container C. Known means, such as a spindle 11, urged by a spring 15 into the loading chamber 9 from a cavity 17, rotatably supports the core member X of the film container C during film advance and film rewind in the camera. The spindle 11 is split to engage a cross-rib, not shown, of the core member X, within a well at one end 19 of the film container C. A slot-like extension 21 of the loading chamber 9 is shaped to hold the lipped portion Y of the film container C to prevent rotation of the film container as the filmstrip is advanced from the container or wound back into the container. Film advance and film rewind may be accomplished using commonplace drive mechanisms and, in this connection, there is illustrated in FIG. 3, a sprocket wheel 23 for engaging and advancing the filmstrip. As is customary, film advance is from the slot-like extension 21 of the loading chamber 9, across an exposure frame 25, and onto a take-up spool 27, rotatably mounted within a take-up chamber 29 in the camera body 1. The take-up spool 27 includes a circular array of radially extending lugs 31 for automatically engaging a hole H in the film leader L. Two parallel beveled guide surfaces 33 and 35 or other suitable means, such as guide rails or guide rollers, not shown, define a film passageway or a film path, indicated by a double-headed arrow P in FIG. 3, for guiding film between the slot-like extension 21 and the take-up chamber 29.

Figure 4:
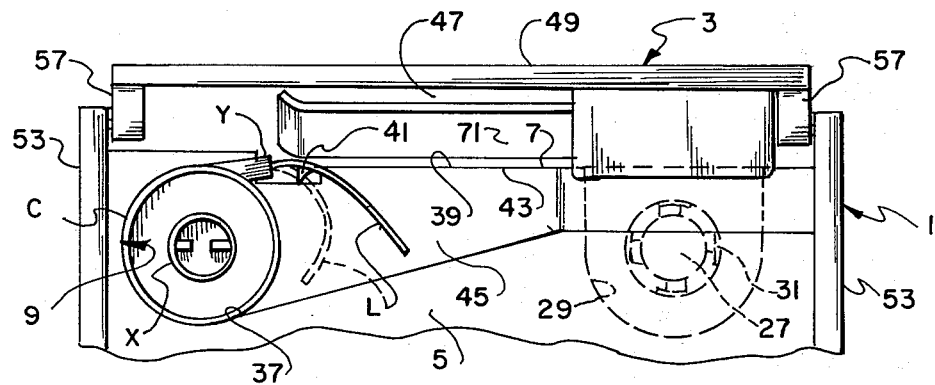
FIG. 4 is a bottom plan view of the opened camera, depicting the same state of film loading as in FIG. 3.

In FIGS. 3 and 4, it can be seen that the loading chamber 9 is only accessible for container-loading at the bottom portion 5 of the camera body 1, through an entrance opening 37 to the loading chamber. The entrance opening 37 is uncovered by partially opening the cover door 3, as shown in FIGS. 2 and 4. This permits the film container C to be inserted axially, i.e., by the end 19 first in FIG. 3, through the entrance opening 37 into the loading chamber 9. The film passageway P is accessible for leader-loading at the bottom portion 5 of the camera body 1, along a flat surface 39 extending parallel to the film passageway. As the film container C is inserted axially into the loading chamber 9, the flat surface 39 supports the film leader L, which moves edgewise, i.e., longitudinal edge first, into the film passageway P.

Figure 5:
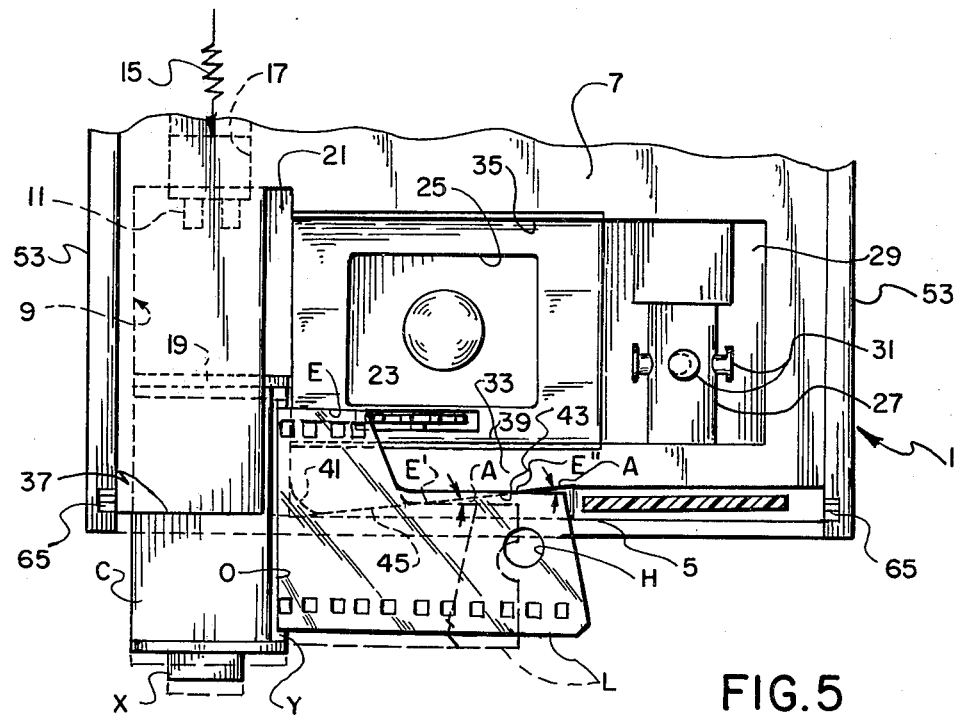
FIGS. 5 and 6 are back elevation and plan views, respectively, depicting an intermediate state of film loading.
Figure 6:
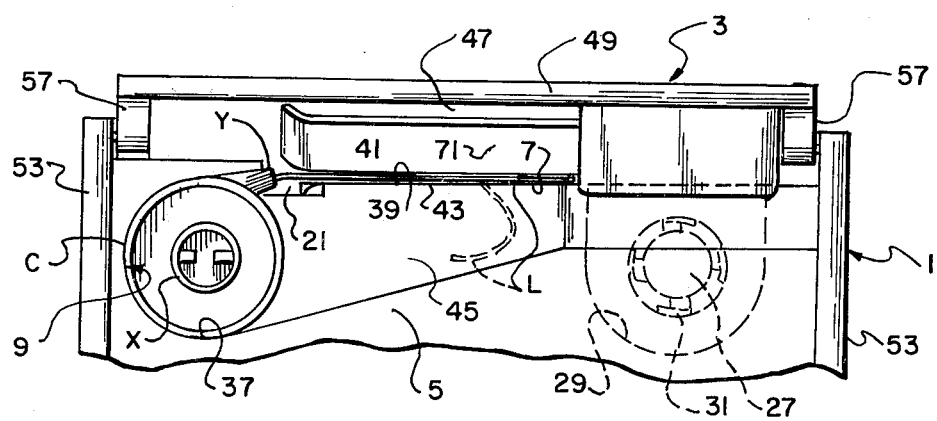

Since the film leader L is normally coiled, as shown in FIG. 2, there is provided means for uncurling the film leader as the film container C is inserted into the loading chamber 9. When the end 19 of the film container C is moved through the entrance opening 37 into the loading chamber 9, as shown in FIG. 3, a longitudinal edge portion E of the film leader L, proximate the container opening O, is pushed against a quarter-round corner 41, adjacent the slot-like extension 21 of the loading chamber. The corner 41, as shown in FIG. 4, directs the longitudinal edge portion E crosswise onto an inclined straight edge 43, formed by the juncture of the flat surface 39 and an inclined relieved plane 45. The straight edge 43 operates in two ways, as shown in FIGS. 5 and 6. First, the straight edge 43 deflects successive longitudinal edge portions, for example E' and L" in FIG. 5, of the film leader L into a substantially straight line, to incrementally uncurl the film leader, as those edge portions are pushed crosswise against the straight edge by insertion of the film container C into the loading chamber 9. And second, the straight edge 43 deflects the respective straightened edge portions of the film leader L onto the flat surface 39. The flat surface 39, in turn, acts as a support which prevents the film leader from re-curling and guides the uncurled leader, straightened edge portions, into the film passageway P.

As shown in FIG. 5, the straight edge 43 is inclined from the entrance opening 37 to the loading chamber 9, to make an oblique angle A with successive longitudinal edge portions, for example E' and E'', of the film leader L as the film container C is inserted into the loading chamber. Orientation of the straight edge in this manner with respect to successive longitudinal edge portions of the film leader, facilitates uncurling and minimizes any chance of a snag. The plane 45, over which the film leader L moves to uncurl, as shown in FIG. 6, is inclined in conformity with the straight edge 43 and is relieved from the remainder of the bottom portion 5 of the camera body 1 in order to provide sufficient room for the film leader to uncurl without affecting the straightening action occurring along the straight edge.

Figure 7:
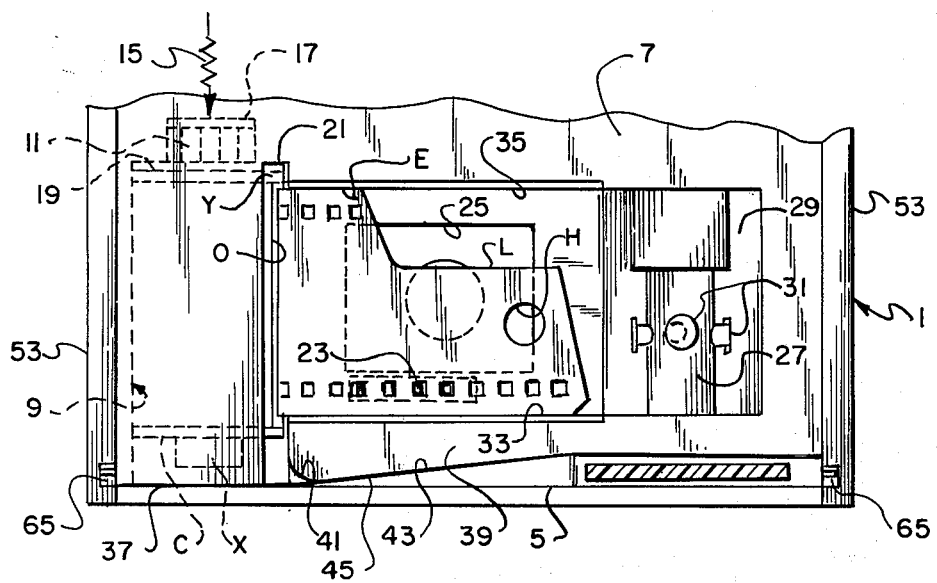
FIG. 7 is a back elevation view of the opened camera, depicting the final state of film loading.

When the film container C is completely inserted in the loading chamber 9, as shown in FIG. 7, the uncurled leader L comes to rest in the film passageway P between the beveled guide surfaces 33 and 35 and is positioned for engagement with the sprocket wheel 23. Means, not shown, are provided on the inside of the cover door 3 for holding the uncurled leader L against the sprocket wheel 23 upon closing the cover door. Rotation of the sprocket wheel 23 and the take-up spool 27, for advancing the first exposure area of the filmstrip into alignment with the exposure frame 25, may be initiated automatically by closing the cover door 3 or manually by depressing a button, not shown, on the camera body 1.

Figure 8:
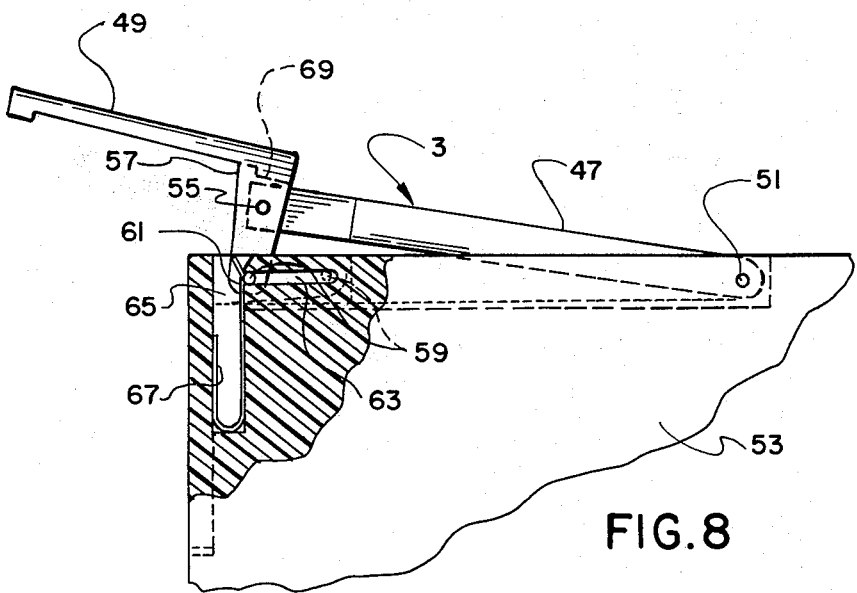
FIG. 8 is a partial side elevation view of the camera, showing a cover door in accordance with a preferred embodiment of the invention and opened to a partially opened position for film loading.

According to the invention, the cover door 3, as shown in FIGS. 1 and 8, preferably comprises a back door 47 and a bottom door 49. The back door 47 is supported for pivotal opening and closing movement on a first axis, aligned with a first pair of pivot pins 51 connecting the back door with opposite sides 53 of the camera body 1. The bottom door 49 is supported for pivotal opening and closing movement on a second axis, aligned with a second pair of pivot pins 55 connecting respective arm-like extensions 57 of the bottom door with the back door 47 at intermediate locations on the arm-like extensions. The second axis, defined by the two pins 55, extends parallel to the first axis, defined by the two pins 51. A pair of follower pins 59 project from respective end portions 61 of the two arm-like extensions 57 into a pair of cam or motion-imparting slots 63, formed in the opposite sides 53 of the camera body 1. The follower pins 59 are constrained by the cam slots 63 to translational and pivotal movements within the cam slots. With such an arrangement, the cover door 3 may be opened from a closed position to a partially opened position (for film loading) simply by pivoting the bottom door 49 open on the pivot pins 55, as shown in FIG. 8. Opening the bottom door 49, pivots the arm-like extensions 57 of the bottom door about their intermediate locations adjacent the pivot pins 55. At the same time, the follower pins 59 on the arm-like extensions 57 translate and pivot in the cam slots 63. This causes the arm-like extensions 57 to act as follower arms, urging the back door 47 by way of the pivot pins 55 to pivot open on the pivot pins 51. Accordingly, opening the bottom door 49 to the partially opened position, shown in FIG. 8, causes a like opening of the back door 47. And conversely, as can be appreciated from FIG. 8, closing the bottom door 49 from the partially opened position, will cause a like closing of the back door 47.

Figure 9:
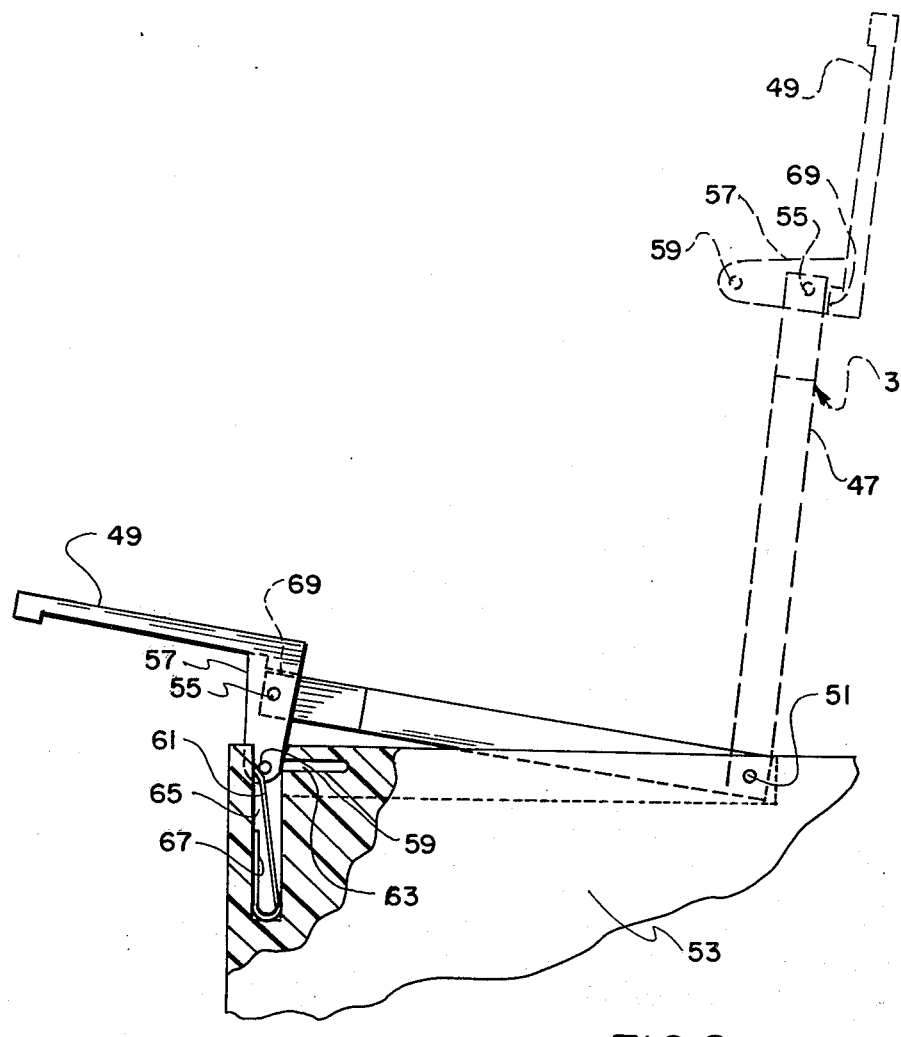
FIG. 9 is a partial side elevation view of the camera, showing the cover door opened to a fully opened position.

The two cam slots 63 open into respective pin-exit slots 65, formed in the opposite sides 53 of the camera body 1. When the cover door 3 is in the partially opened position, as shown in FIG. 8, a pair of flexible pin-retaining members 67 in the respective pin-exit slots 65 ordinarily prevent the two follower pins 59 from moving out of the respective cam slots 63 into the pin-exit slots. The follower pins 59 are blocked by the pin-retaining members 67 at individual locations overcenter of the pivot pins 55, which maintains the cover door 3 in the partially opened position. To open the cover door 3 from the partially opened position to a fully opened position, as shown in FIG. 9, the bottom door 49 is pivoted open on the pivot pins 55 until the follower pins 59 flex the pin-retaining members 67 aside and move into the pin-exit slots 65. At this time, an interior edge 69 of the bottom door 49 bears against the back door 47, which prevents the bottom door from pivoting open farther on the pivot pins 55. However, the bottom door 49 can then be pivoted open in unison with the back door 47 on the pivot pins 51. Pivoting the bottom door 49 open with the back door 47 on the pivot pins 51, removes the follower pins 59 from the pin-exit slots 65, permitting both doors 3 to be opened to the fully opened position.

When the cover door 3 is in the partially opened position, as shown in FIGS. 2 and 8, the back door 47 shields the camera interior by substantially covering the back portion 7 of the camera body 1, and the bottom door 49 uncovers the bottom portion 5 of the camera body to allow limited access to the camera interior for film loading. Conversely, the cover door 3 in the fully opened position, as shown in FIG. 9, allows much greater access to the camera interior by uncovering the back portion 7 of the camera body. Accordingly, on the one hand, the cover door 3 in the partially opened position substantially shields the camera interior during film loading from foreign particles, fingerprints, and tampering with an interior mechanism. And on the other hand, the cover door in the fully opened position allows access to the camera interior should it become necessary, for example, to clear a film jam in the camera or to repair or clean an interior mechanism.

A spring-urged pressure plate 71, shown in FIG. 4, is mounted on the inside of the back door 47. When the cover door 3 is in the closed position, the pressure plate 71 is located adjacent the film passageway P to hold a section of filmstrip from the film container C against the exposure frame 25 during picture-taking. However, the pressure plate 71 is moved with the cover door 3 to the partially opened position, in FIG. 4, away from the film passageway P, to provide space for moving the film leader L into the film passageway as the film container C is inserted into the loading chamber 9. Means, not shown, is located on the inside of the bottom door 49 for lightly depressing the film container C and the core member X, to assure their proper positioning in the loading chamber 9, as the cover door 3 is closed from the partially opened position.

The invention has been described in detail with particular reference to a preferred embodiment thereof, but it will be understood that variations and modifications can be effected within the spirit and scope of the invention.

I claim:

1. In a photographic camera of the type wherein a loading door is opened to allow insertion of a film container into said camera, and a back door is opened to move a film pressure member on said back door to provide space for locating film from the container in said camera, the improvement comprising:
   means supporting said loading door and said back door for opening and closing movement on separate axis; and
   moving means for opening said back door in response to opening movement of said loading door and for closing said back door in response to closing movement of said loading door.

2. The improvement as recited in claim 1, wherein said moving means includes means connecting said loading door and said back door to open and close said back door, respectively, in conjunction with opening and closing movement of said loading door.

3. The improvement as recited in claim 1, wherein said moving means includes a follower member coupled to said back door, and camming means for imparting motion to said follower member in response to opening and closing movement of said loading door.

4. In a bottom-loaded photographic camera of the type wherein a bottom door is opened to allow insertion of a film container into said camera, and a back door is opened to move a film pressure member on said back door to provide space for locating film from the container in said camera, the improvement comprising:
   means supporting said bottom door and said back door for opening and closing movement on separate, parallel axes; and
   means, connecting said bottom door and said back door, for opening said back door in conjunction with opening movement of said bottom door and for closing said back door in conjunction with closing movement of said bottom door.

5. In a bottom-loaded photographic camera of the type wherein a bottom door is opened to allow insertion of a film container into said camera, and a back door is opened to move a film pressure member on said back door away from the camera interior to provide space for locating film from the container in said camera, the improvement comprising:
   means supporting said back door for (a) opening movement to a partially opened position in which said back door is adjacent the camera interior but is opened sufficiently to move said pressure member to provide space for locating film in said camera, and (b) closing movement to return said pressure member to the camera interior; and
   means, connecting said bottom door and said back door, for opening said back door to its partially opened position in conjunction with opening movement of said bottom door and for closing said back door in conjunction with closing movement of said bottom door.

6. In a bottom-loaded photographic camera of the type wherein a bottom door is opened to allow insertion of a film container into said camera, and a back door is opened to move a film pressure member on said back door away from the camera interior to provide space for locating film from the container in said camera, the improvement comprising:

means supporting said back door for (a) pivotal opening movement on a first axis to a partially opened position in which said back door is adjacent the camera interior but is opened sufficiently to move said pressure member to provide space for locating film in said camera, and (b) pivotal closing movement on the first axis to return said pressure member to the camera interior;

means supporting said bottom door for pivotal opening and closing movement on a second axis substantially parallel to the first axis; and means, connecting said bottom door and said back door, for pivoting said back door open to its partially opened position in conjunction with opening movement of said bottom door and for pivoting said back door closed from its partially opened position in conjunction with closing movement of said bottom door.

7. In a bottom-loaded photographic camera of the type wherein a bottom door is opened to allow insertion of a film container into said camera, and a back door is opened to move a film pressure member on said back door to provide space for locating film from the container in said camera, the improvement comprising:

means supporting said back door for pivotal opening and closing movement on a first axis;

means connecting said bottom door and said back door along a second axis substantially parallel to the first axis to support said bottom door for pivotal opening and closing movement on the second axis; and cam means, coupled with said bottom door and said connecting means, for pivoting said back door open in conjunction with opening movement of said bottom door and for pivoting said back door closed in conjunction with closing movement of said bottom door.

8. The improvement as recited in claim 7, wherein said cam means includes a follower member fixed to said bottom door and said connecting means for pivoting on the second axis with said bottom door, said follower member having an end portion spaced from said bottom door and said connecting means, and motion imparting means coupled to said end portion for moving said follower member as said bottom door is pivoted on the second axis, to urge said connecting means to pivot said back door on the first axis.

* * * * *